United States Patent Office 3,539,343
Patented Nov. 10, 1970

3,539,343
LIGHT-SENSITIVE REPRODUCTION LAYER
AND REPRODUCTION MATERIAL PROVIDED THEREWITH
Johannes Munder, Wiesbaden-Biebrich, Hans Ruckert, Wiesbaden-Schierstein, Hartmut Steppan, Wiesbaden-Dotzheim, Günter Messwarb, Kelkheim, and Walter Luders, Neu-Isenburg, Germany, assignors to Kalle Aktiengesellschaft, Wiesbaden-Biebrich, Germany, a corporation of Germany
No Drawing. Filed July 3, 1968, Ser. No. 742,185
Claims priority, application Germany, July 6, 1967, 1,597,782
Int. Cl. G03c 1/68
U.S. Cl. 96—35.1
19 Claims

ABSTRACT OF THE DISCLOSURE

This invention relates to a light-sensitive reproduction layer which contains as the light-sensitive substance at least one homopolymer or copolymer of an epoxide of the following general Formula I

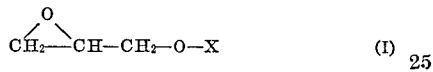
(I)

wherein X is one of the groups

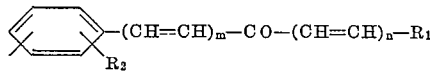

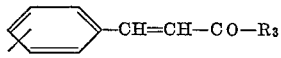

and

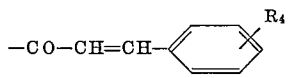

in which $R_1$ is a carbocyclic or heterocyclic aromatic group linked through a ring carbon atom,
$R_2$ is hydrogen, halogen, an alkyl or alkoxy group,
$R_3$ is an alkoxy, or an aryloxy group or the group

in which $R_5$ and $R_6$ are alkyl groups which may be linked together to form an alkylene group,
$R_4$ is hydrogen, halogen, an alkyl, alkoxy or nitro group,
$m$ is 0 or 1, and
$n$ is 0 or a whole number from 1 to 4 and the sum of $m+n$ is not less than 1.

---

This invention relates to a reproduction layer which contains as the light-sensitive component or consists of novel polymers of the polyether type which undergo a reduction of their solubility or become insoluble by the action of light.

The present invention provides a light-sensitive reproduction layer which is suitable for the production of photographic copies, tanned images, relief images and printing plates, and which contains at least one homopolymer or copolymer prepared from an epoxide of the following Formula I

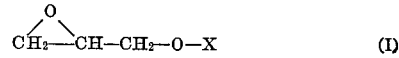
(I)

wherein X is one of the groups

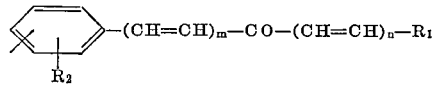

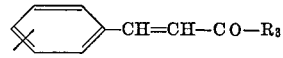

or

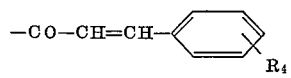

in which $R_1$ is a carbocyclic or heterocyclic aromatic radical linked through a ring carbon atom,
$R_2$ is hydrogen, halogen, an alkyl or alkoxy group,
$R_3$ is an alkoxy or an aryloxy group or the group

wherein $R_5$ and $R_6$ are alkyl groups which, if desired, are linked together to form an alkylene group,
$R_4$ is hydrogen, halogen, a nitro, alkyl or alkoxy group,
$m$ is 0 or 1, and
$n$ is 0 or a whole number from 1 to 4, wherein $m+n$ is not less than 1.

Preferably employed are monomers of Formula I in which X stands for

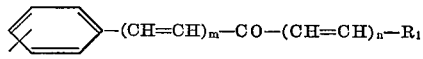

with the limitation, however, that in those cases where $m$ is 1, $n$ is either 0 or 1.

Where $R_1$ is a carbocyclic aromatic group which, for example, may be of the benzene, naphthalene, or anthracene group, this group may carry additional substituents, e.g. alkyl groups, preferably with 1 to 4 carbon atoms, alkoxy groups, preferably with 1 to 4 carbon atoms, halogen atoms or nitro groups. In this case, for example, two alkyl or alkoxy groups may be linked to form a ring, e.g. to form a methylene dioxy group. Preferred examples of $R_1$ are phenyl, 4-methyl-phenyl, 4-methoxyphenyl, 4-isopropylphenyl, and methylene-dioxy - (3,4) - phenyl groups.

A preferable field of application for these polymers is the production of printing plates wherein the polymer cross-links by the action of light, e.g. as etch-resistant layers (so-called "resists") which may be used in the production of relief or intaglio printing plates or, after dissolving away the unexposed layer parts, as a carrier for greasy ink on hydrophilic metal supports (planographic printing plates). Also, the production of multi-metal printing plates is possible with the use of the polymers of the present invention, as resists as well as the preparation of printed circuits.

The reproduction layers of the present invention may be combined with known reproduction layers, e.g. with those from polymers cross-linkable by the action of light or those from diazo compounds.

A technical advantage is the fact that the photo-active polyethers used in accordance with the present invention can be more easily prepared than known photo-active polymers which also carry chalcone and cinnamic acid side chains. Another advantage is the fact that the polymers used in accordance with the present invention, at least in the main chain, are difficultly saponifiable. This characteristic is very essential since it guarantees uniform chemical and physical properties, particularly regarding solubility, upon contact with acid or alkaline treating solutions, e.g. etching solutions or developers.

Exemplary photo-active epoxides useful for the preparation of the homopolymers or copolymers employed in accordance with the invention as reproduction layer materials are given below:

Formula 1
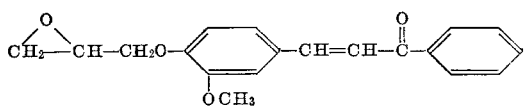

Formula 2
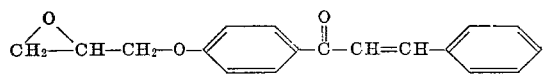

Formula 3
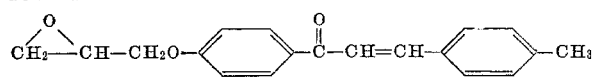

Formula 4
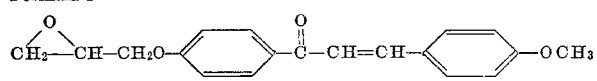

Formula 5
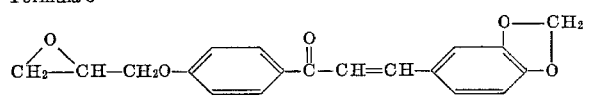

Formula 6
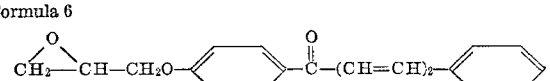

Formula 7
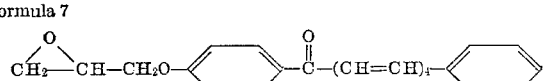

Formula 8
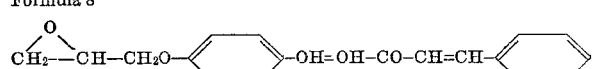

Formula 9
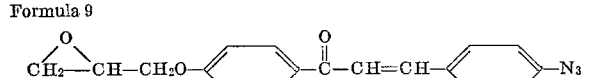

Formula 10
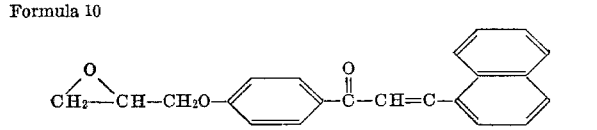

Formula 11
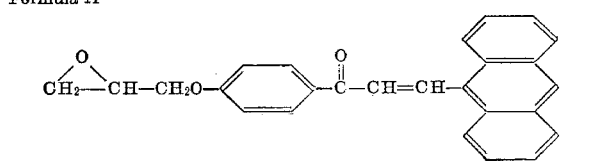

Formula 12
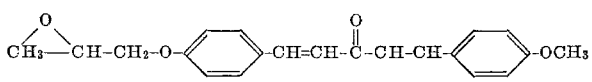

Formula 13
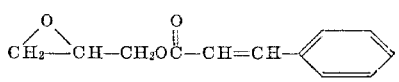

Formula 14
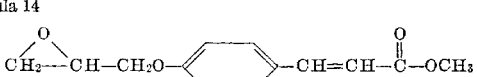

Formula 15
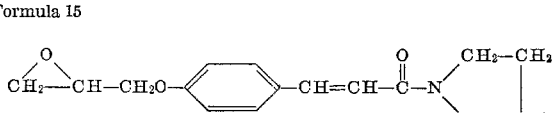

Formula 16
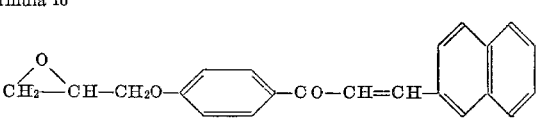

The preparation of the polymers used in accordance with the invention as reproduction layer materials is performed by polymerization of one or more photo-active epoxides of the general Formula I in the presence of ionic catalysts which, under the polymerization conditions prevailing, cause a ring opening of oxirane rings.

In addition to the glycide compounds with chalcone or cinnamic acid groups according to the above Formula I it is possible in the preparation of the copolymers used in accordance with the invention to use up to 20 mole percent of all monomeric glycidoxy ketones of the general Formula II

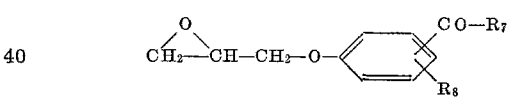

wherein $R_7$ is alkyl, phenyl, alkoxyphenyl or a halogenated phenyl group, and $R_8$ is hydrogen, halogen, an alkyl or alkoxy group.

For polymerization, cationic polymerization catalysts are preferably employed, e.g. boron fluoride, phosphorus pentafluoride as well as the ether-addition products of these substances. With these catalystst, polymerization preferably is performed at temperatures as low as possible, approximately in the range from —5° C. to +60° C. When polymerization is performed in solution, solvents are used which do not contain active hydrogen, e.g. methylene chloride and chloroform.

It has been found to be advantageous to exclude the action of daylight and normal room light during the polymerization reaction and the ensuing processing of the polymer products.

Advantageously, polymerization should be effected with the exclusion of oxygen, e.g. in a nitrogen atmosphere. It is desirable to exclude moisture insofar as possible.

Preferably, polymers are used in the reproduction layers of the invention which are solid at room temperature. However, polymers which are pasty or liquid at room temperature also may be employed.

The solubility characteristics of the copolymers vary within wide limits, depending upon the meaning of X in Formula I.

By exposing the polymers to light of a wavelength between 2000 and 7000 A., the solubility of a polymer used in accordance with the invention, in solvents which dissolve the unexposed polymers, is reduced or destroyed. Suitable light sources are particularly those the emitted radiation of which contains a high proportion of ultraviolet light, e.g. in the range from 3000 to 4000 A., e.g. carbon arc lamps, xenon lamps, mercury vapor lamps, actinic and superactinic luminous substance lamps.

For the preparation of the reproduction material, the reproduction layers according to the invention are applied to the support in known manner. The usual additives, such as dyestuffs, sensitizers known to be suitable for sensitizing chalcone and cinnamic acid derivatives, pigments, wetting agents, plasticizers, anti-oxidants and stabilizers against thermal decomposition, as well as organic and inorganic fillers, may be incorporated in the reproduction layer. Suitable organic fillers are, e.g. photo-inactive polyethers or other polymers which are compatible with the photo-active polyethers, e.g. those of the vinyl polymer series. Suitable inorganic fillers are, e.g. glass powder, silicon dioxide in extremely fine distribution, or clay. Advantageously, these additives should be selected in such a manner, however, that they reduce as little as possible the optical transparency of the reproduction layer in the main range of absorption of the light-sensitive polymers. Their total amount generally does not exceed 50 percent by weight, calculated on the light-sensitive polymers.

Depending upon the type of light-sensitive polymer used, development of the imagewise exposed reproduction materials may be effected with an organic solvent, e.g. a carboxylic acid ester, such as methyl acetate, ethyl acetate, aliphatic ketones, such as methylethyl ketone and acetone; ethers, such as dioxane and tetrahydrofuran, or with mixtures of such organic solvents with one another or with other solvents, e.g. with aromatic hydrocarbons.

If they do not already contain dyestuffs, the exposed areas of the layer may be subsequently dyed, e.g. with solutions of dyestuffs in organic solvents or with greasy printing inks, depending upon the characteristics of the particular layer, in order to improve the visibility of the image obtained.

The invention is further illustrated by the following examples wherein if the part by weight is 1 g. the part by volume is 1 ml. The percentages are by weight; the temperature references are to degrees centigrade.

EXAMPLE 1

A 1.5 mm. thick zinc plate which had been roughened by treating it with diluted nitric acid was coated on a plate whirler with a 1.4 percent solution of a polymer of the epoxy chalcone of Formula 6 above in chloroform (80 r.p.m.) and dried for 2 minutes at 100° C. After imagewise exposure to light (5 minutes in an illuminating device equipped with 13 Philips fluorescent tubes of the type TL-AK 40 W/05 mounted in a plane of 60 x 60 cm.; the distance from the lamps is 7 to 8 cm.; the cover is a polyvinyl chloride film) under a negative, it was developed by immersion or spraying with ethyl acetate. After drying, the non-image areas were deep-etched in the usual manner with 6 percent nitric acid. A positive relief printing plate was obtained.

The polymer cross-linkable by the action of light is prepared as follows: A 100 ml. three-necked flask with stirrer, $CaCl_2$ tube and dropping funnel was filled with 0.3 part by weight of boron fluoride diethyl etherate, suspended in 12 parts by volume of dry chloroform. A solution of 3 parts by weight of the glycidoxychalcone of Formula 6 above in 12 parts by volume of absolute chloroform was dropwise added at 15° C. A red-brown dyed reaction mixture was obtained. The internal temperature abruptly increased to 22° C. After stirring for 4 hours at room temperature, the mixture was poured into 100 parts by volume of methanol. The precipitating viscous mass was kneaded with fresh methanol, then again dissolved in chloroform (about 10 parts by volume) and again precipitated by pouring into 100 parts by volume of methanol.

After drying, 0.75 part by weight of a polymer was obtained which had a melting point in the range of 83 to 97° C. The mean molecular weight was 2300.

EXAMPLE 2

The procedure employed was the same as that described in Example 1 with the exception that a 2.5 percent solution of a polymer of the glycidoxychalcone of Formula 8 in chloroform was used for coating.

Imagewise exposure was carried out for 10 minutes using the light source described in Example 1 and the plate was processed into a relief printing plate as described in Example 1. The preparation of the polymer was performed analogously to Example 1 with the single exception that the material was not stirred for 4 hours at room temperature but left overnight at +3° C.

A 37 percent yield of a polymer having a mean molecular weight of 2200 was obtained.

EXAMPLE 3

The procedure employed was the same as that described in Example 2 but, for coating the zinc support, a 2.5 percent solution of a polymer in chloroform was used which had been obtained by polymerization of a mixture of equal parts of the glycidoxychalcones of Formulae 4 and 8 under the polymerization conditions described in Example 2.

The polymer was obtained in a yield of about 60 percent and had a mean molecular weight of 2100.

EXAMPLE 4

An electrolytically roughened aluminum foil was coated on a plate whirler with a 2 percent solution of a polymer of the photo-active glycide ether of Formula 5 in chloroform. After imagewise exposure (5 minutes to the light source described in Example 1) under a negative, development was carried out by immersion or spraying with ethyl acetate. After wiping over with about 1 percent aqueous phosphoric acid, the plate was inked up with greasy ink. A positive printing plate was obtained which could be used for making prints in usual offset printing machines.

The polymer, prepared analogously to Example 1, was obtained in a yield of 60 percent and had a mean molecular weight of 1500.

EXAMPLE 5

A conventional copper/aluminum bimetal plate was coated on the copper side with a 5 percent solution of the polymer used in Example 3 in chloroform. The plate was exposed for 10 minutes to the light source described in Example 1 under a negative and then developed by spraying with acetic ethyl ester.

The copper in the uncoated areas was then removed down to the aluminum by means of the etching solution "Lithengrave Etch" marketed by Printing Developments Inc., New York. It is also possible to use as the etch an aqueous solution containing 45 percent of $Fe(NO_3)_3$ and 5 percent of calcium acetate.

After removing the hardened polymer layer and treatment with diluted phosphoric acid, the plate could be inked up with greasy ink. An efficient positive offset printing plate was obtained.

EXAMPLE 6

A trimetal plate (Al—Cu—Cr) was coated on the chromium side with a 5 percent solution of the polymer used in Example 3. The plate was exposed under a positive original under the conditions employed in Example 5 and developed in the same manner by spraying with ethyl acetate. It was then treated with a commercial chromium etch (e.g. an aqueous solution containing 30 percent of $CaCl_2$, 20 percent of $ZnCl_2$, about 1.5 to 3 percent of $NH_4Cl$, tartaric acid and concentrated hydrochloric acid) until the chromium was etched away in the uncoated areas down to the copper layer. After removing the hardened reproduction layer, a highly efficient positive planographic printing plate was obtained.

EXAMPLE 7

An aluminum foil roughened by brushing was coated with a 2 percent solution of a polymer of the photoactive glycide ether of Formula 16 in ethylene glycol monomethyl ether acetate and dried. It was exposed under a negative for 1 to 5 minutes under the conditions described in Example 1. It was developed by spraying it with trichloroethylene and dried. It was then wiped over with aqueous phosphoric acid (about 1 percent) and inked up. A positive planographic printing plate was obtained.

The preparation of the polymer was analogous to that of Example 2. The polymer was obtained in a 77 percent yield; the mean molecular weight was 2050.

EXAMPLE 8

The procedure was the same as that described in Example 7 with the exception that a 2 percent solution of the compound of Formula I in ethylene glycol monomethyl ether acetate was used for coating.

The polymer was obtained analogously to Example 7 in a yield of 18 percent; the mean molecular weight was 1200.

It will be obvious to those skilled in the art that many modifications may be made within the scope of the present invention without departing from the spirit thereof, and the invention includes all such modifications.

What is claimed is:

1. A supported light-sensitive reproduction layer which comprises at least one light-sensitive homopolymer containing an expoxide of the following general Formula I or at least one light-sensitive copolymer of two expoxides of the following general Formula I $$CH_2-CH-CH_2-O-X \quad (I)$$

wherein X is selected from the group consisting of

[structure: phenyl ring]$-(CH=CH)_m-CO-(CO=CH)_n-R_1$
with $R_2$ substituent

[structure: phenyl ring]$-CH=CH-CO-R_3$ and $-CO-CH=CH-$[phenyl ring with $R_4$]

in which $R_1$ is selected from the group consisting of carbocyclic or heterocyclic aromatic groups linked through a ring carbon atom; $R_2$ is selected from the group consisting of hydrogen, halogen, an alkyl or alkoxy group; $R_3$ is selected from the group consisting of an alkoxy or an aryloxy group or the group $$-N\begin{matrix}R_5\\R_6\end{matrix}$$

wherein $R_5$ and $R_6$ are alkyl groups which may be linked together to form an alkylene group; $R_4$ is selected from the group consisting of hydrogen, halogen, an alkyl, alkoxy, or nitro group; $m$ is 0 or 1; and $n$ is 0 or a whole number from 1 to 4 and the sum of $m+n$ is not less than 1.

2. A reproduction layer according to claim 1 in which X is the group

[phenyl ring]$-(CH=CH)_m-CO-(CH=CH)_n-R_1$ wherein either $m$ is 0 and $n$ is 1 to 4, or $m$ is 1 and $n$ is 0 or 1.

3. A reproduction layer according to claim 1 in which the light-sensitive polymer is a homopolymer of an epoxide of the general Formula I.

4. A reproduction layer according to claim 1 in which the light-sensitive polymer is a copolymer consisting of at least 80 mole percent or at least one epoxide of the general Formula I and not more than 20 mole percent of at least one epoxide of the following Formula II $$CH_2-CH-CH_2-O-\text{[phenyl with }COR_7\text{ and }R_8\text{]}$$

wherein $R_7$ is selected from the group consisting of alkyl, phenyl, alkoxyphenyl, or halogenated phenyl groups; and $R_8$ is selected from the group consisting of hydrogen, halogen, alkyl or alkoxy groups.

5. A reproduction layer according to claim 1 in which the layer is on a support suitable for use in planographic printing.

6. A reproduction layer according to claim 1 in which the epoxide has the formula $$CH_2-CH-CH_2O-\text{[phenyl]}-\overset{O}{\underset{\|}{C}}-(CH=CH)_2-\text{[phenyl]}$$

7. A reproduction layer according to claim 1 in which the epoxide has the formula $$CH_2-CH-CH_2O-\text{[phenyl]}-CH=CH-CO-CH=CH-\text{[phenyl]}$$

8. A reproduction layer according to claim 1 in which the epoxide has the formula $$CH_2-CH-CH_2O-\text{[phenyl]}-\overset{O}{\underset{\|}{C}}-CH=CH-\text{[phenyl with O-CH}_2\text{-O]}$$

9. A reproduction layer according to claim 1 in which the epoxide has the formula $$CH_2-CH-CH_2O-\text{[phenyl]}-CO-CH=CH-\text{[naphthyl]}$$

10. A reproduction layer according to claim 1 in which the epoxide has the formula $$CH_2-CH-CH_2O-\text{[phenyl]}-CH=CH-\overset{O}{\underset{\|}{C}}-\text{[phenyl with }OCH_3\text{]}$$

11. A photographic reproduction process which comprises exposing a supported light-sensitive layer to light under a master and developing the resulting image, the layer comprising at least one light-sensitive homopolymer containing an epoxide of the following general Formula I or at least one light-sensitive copolymer of two epoxides of the following general Formula I $$CH_2-CH_2-CH_2-CH_2-O-X \quad (I)$$

wherein X is selected from the group consisting of

[phenyl ring]$-(CH=CH)_m-CO-(CH=CH)_n-R_1$
with $R_2$ substituent

[phenyl ring]$-CH=CH-CO-R_3$ and $-CO-CH=CH-$[phenyl ring with $R_4$]

in which $R_1$ is selected from the group consisting of carbocyclic or heterocyclic aromatic groups linked through a ring carbon atom; $R_2$ is selected from the group consisting of hydrogen, halogen, an alkyl or alkoxy group;

$R_3$ selected from the group consisting of an alkoxy or an aryloxy group or the group

wherein $R_5$ and $R_6$ are alkyl groups which may be linked together to form an alkylene group; $R_4$ is selected from the group consisting of hydrogen, halogen, an alkyl, alkoxy, or nitro group; $m$ is 0 or 1; and $n$ is 0 or a whole number from 1 to 4 and the sum $m+n$ is not less than 1.

12. A photographic reproduction process according to claim 11 in which X is the group

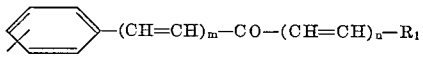

wherein either $m$ is 0 and $n$ is 1 to 4, or $m$ is 1 and $n$ is 0 or 1.

13. A photographic reproduction process according to claim 11 in which the light-sensitive polymer is a homopolymer of an epoxide of the general Formula I.

14. A photographic reproduction process according to claim 11 in which the light-sensitive polymer is a copolymer consisting of at least 80 mole percent of at least one epoxide of the general Formula I and not more than 20 mole percent of at least one epoxide of the following Formula II

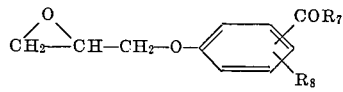

wherein $R_7$ is selected from the group consisting of alkyl, phenyl, alkoxyphenyl, or halogenated phenyl groups; and $R_8$ is selected from the group consisting of hydrogen, halogen, alkyl or alkoxy groups.

15. A photographic reproduction process according to claim 11 in which the epoxide has the formula

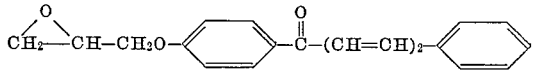

16. A photographic reproduction process according to claim 11 in which the epoxide has the formula

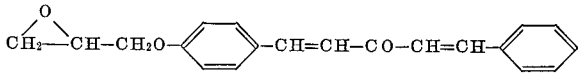

17. A photographic reproduction process according to claim 11 in which the epoxide has the formula

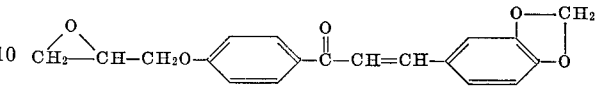

18. A photographic reproduction process according to claim 11 in which the epoxide has the formula

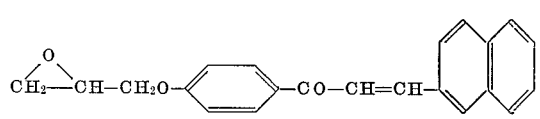

19. A photographic reproduction process according to claim 11 in which the epoxide has the formula

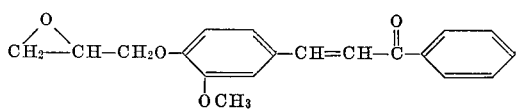

References Cited
UNITED STATES PATENTS

| | | | |
|---|---|---|---|
| 3,409,593 | 11/1968 | Messwarb et al. | 96—115 XR |
| 3,410,824 | 11/1968 | Atkinson | 96—115 XR |
| 3,417,052 | 12/1968 | Messwarb et al. | 96—115 XR |

RONALD H. SMITH, Primary Examiner

U.S. Cl. X.R.

96—115; 260—47, 63